(12) United States Patent
Atkinson (10) Patent No.: US 7,227,445 B2
(45) Date of Patent: Jun. 5, 2007

(54) WIRELESS ACTIVATION SYSTEM AND METHOD

(75) Inventor: Paul Atkinson, Poway, CA (US)

(73) Assignee: Kestrel Wireless, Inc., San Diego, CA (US)

( * ) Notice: Subject to any disclaimer, the term of this patent is extended or adjusted under 35 U.S.C. 154(b) by 776 days.

(21) Appl. No.: 10/632,047

(22) Filed: Jul. 31, 2003

(65) Prior Publication Data

US 2004/0022542 A1 Feb. 5, 2004

Related U.S. Application Data (60) Provisional application No. 60/400,414, filed on Jul. 31, 2002.

(51) Int. Cl.
*G05B 19/00* (2006.01)

(52) U.S. Cl. .................. 340/5.51; 340/5.2; 340/5.22; 340/5.26; 340/5.6; 340/5.1; 369/273; 369/272.1; 720/718; 720/719

(58) Field of Classification Search ........... 340/5.51, 340/5.5, 5.2, 5.1; 713/189; 720/718, 719; 369/52.1, 100, 273, 272.1; 726/27, 28, 30, 726/33, 36
See application file for complete search history.

(56) References Cited

U.S. PATENT DOCUMENTS

| | | | | |
|---|---|---|---|---|
| 3,883,736 A | * | 5/1975 | Liddell | 250/221 |
| 3,893,074 A | * | 7/1975 | Mogi et al. | 367/199 |
| 5,485,520 A | | 1/1996 | Chaum et al. | |
| 5,608,778 A | * | 3/1997 | Partridge, III | 455/411 |
| 5,909,492 A | | 6/1999 | Payne et al. | |
| 6,011,772 A | | 1/2000 | Rollhaus et al. | 369/286 |
| 6,067,028 A | * | 5/2000 | Takamatsu | 340/5.8 |
| 6,259,506 B1 | | 7/2001 | Lawandy | 349/193 |
| 6,298,336 B1 | * | 10/2001 | Davis et al. | 705/41 |
| 6,338,933 B1 | | 1/2002 | Lawandy et al. | 430/270.1 |
| 6,343,063 B1 | | 1/2002 | Rollhaus et al. | 369/286 |
| 6,381,584 B1 | | 4/2002 | Ogram | |
| 6,434,109 B2 | | 8/2002 | Rollhaus et al. | 369/286 |
| 6,441,380 B1 | | 8/2002 | Lawandy | 250/458.1 |
| 6,489,892 B2 | | 12/2002 | Lawandy | 340/572.3 |
| 6,496,406 B1 | * | 12/2002 | Kitagawa | 365/106 |
| 6,511,728 B1 | | 1/2003 | Bakos et al. | 428/64.1 |

(Continued)

FOREIGN PATENT DOCUMENTS

WO WO 2004/097731 A2 11/2004

OTHER PUBLICATIONS

Schoolcraft, L.R., Powertel Tests Smart Cards at FSU, Business Journal—Jacksonville, Jan. 30, 1998, vol. 13, No. 17, p. 3.

(Continued)

*Primary Examiner*—Brian Zimmerman
*Assistant Examiner*—Vernal Brown (57) ABSTRACT

A system and method for wireless activation of a target. A communication device transmits an ID associated with the target to a network operations center. The network operations center provides an activation signal to the communication device. The communication device wirelessly transmits an acoustic activation signal to a nearby activation device. The activation device is positioned proximate the target and causes a change in at least one physical property of the target. The target may be an optical media containing an electrochromic material with optical properties that change on application of an electric signal.

12 Claims, 4 Drawing Sheets

U.S. PATENT DOCUMENTS

| | | | |
|---|---|---|---|
| 6,537,635 B1 | 3/2003 | Bakos et al. | 428/64.1 |
| 7,127,066 B2* | 10/2006 | Solomon et al. | 380/201 |
| 2001/0037254 A1 | 11/2001 | Glikman | |
| 2002/0009296 A1* | 1/2002 | Shaper et al. | 396/56 |
| 2002/0010864 A1* | 1/2002 | Safa | 713/200 |
| 2002/0143634 A1 | 10/2002 | Kumar et al. | |
| 2002/0147913 A1 | 10/2002 | Lun Yip | |
| 2002/0152123 A1 | 10/2002 | Giordano et al. | |
| 2002/0165789 A1 | 11/2002 | Dudek et al. | |
| 2002/0175818 A1 | 11/2002 | King et al. | 340/572.8 |
| 2002/0184112 A1 | 12/2002 | Nagaoka et al. | |
| 2003/0005136 A1 | 1/2003 | Eun | |
| 2003/0028787 A1* | 2/2003 | Fayed et al. | 713/189 |
| 2003/0050856 A1 | 3/2003 | Rijllo et al. | |
| 2003/0078895 A1 | 4/2003 | MacKay | |
| 2004/0054594 A1 | 3/2004 | Forster et al. | 705/18 |
| 2004/0121268 A1* | 6/2004 | Conroy et al. | 430/321 |
| 2004/0200061 A1 | 10/2004 | Coleman et al. | 29/825 |
| 2005/0083829 A1* | 4/2005 | Selinfreund et al. | 369/272.1 |

OTHER PUBLICATIONS

Anon., A Shovel Maker Searching out Gold Diggers in the US: Brokat Aims to Raise Its Profile Following Interest in Germany over its Electronic Signature Technology, say Bertrand Benoit, Financial Times London Edition (Abstract Only), Mar. 23, 2000, p. 42.

Anon., Nokia Trials Cashless Payment Technology for Mobile Phones, Precision Marketing, Jan. 29, 2001, vol. 13, No. 18, p. 8.

Hoffman, K. E., New Options in Wireless Payments, Internet World, Apr. 1, 2001, vol. 7, No. 7, p. 37.

Dezoysa, S., The Cost of M-Commerce, Telecommunications, Jul. 2001, vol. 35, No. 7, p. 10.

Harris, R., "Security Measures Turn off Audiophiles from New Gadgets to Thwart Digital Piracy, Companies Have Created CD Players and Discs That Block Copying", Philadelphia Inquirer, Nov. 7, 2002, City-D-East Edition, Business Section, p. C11, see paragraph beginning "DVD-Audio discs use."

* cited by examiner

WIRELESS ACTIVATION SYSTEM AND METHOD

RELATED APPLICATIONS

This application claims priority in U.S. provisional application Ser. No. 60/400,414, filed on Jul. 31, 2002.

FIELD OF THE INVENTION

The present invention relates to a system and method for wireless activation of an item at a user's point-of-presence (POP).

BACKGROUND OF THE INVENTION

Activation of, or regulation of access to, articles or media at a consumer's immediate point-of-presence (POP) is an emerging media distribution model. Examples include enabling pay-per-view movies at home or on the road, and remote activation of driver's licenses, credit cards, tickets, software, electronic games and products. Flexibility in the distribution model, such as the ability to provide pay-for-play, repeatable play and on-demand play, is highly desirable. Applications such as these require a method of activating an article or media at the consumer's POP in a controlled manner that facilitates different business objectives. The ability to provide repeatable (i.e. multi-use) and dynamic activation and regulation of access to optical media such as CDs and DVDs, in a manner that reduces shipping costs and environmental impact, is of particular interest.

SUMMARY OF THE INVENTION

The present invention provides a novel system and method for wireless activation of an item or target. The invention also provides a novel form of optical media for use in conjunction with the system that facilitates activation via use of a material attached to or embedded in the optical media and having an optical property that may be altered by application of an electrical signal.

Accordingly, one embodiment of the invention is a method for wireless activation of a target. A third party determines whether a user is authorized to activate a target and provides an activation signal to the user's communication device. The communication device wirelessly transmits the activation signal to an activation device proximate the target. The activation device activates the target by applying a signal to the target that changes at least one physical property of the target.

Another embodiment of the invention is an optical media that is altered by application of an electrical signal to affect the perceptibility of the optical media.

Another embodiment of the invention is a method for regulating access to content within an optical media comprising emitting an acoustic signal from a communication device proximate the optical media to alter at least one optical property of the optical media.

Another embodiment of the invention is a wireless activation system. The system includes a target to be activated, and an activation device that applies an electrical signal to the target to effect a change in at least one physical property of the target and thereby activate the target. The system also includes a communication device that provides an activation signal to the activation device to permit activation of the target, and a third party entity that participates in the activation of the target in response to information provided by the communication device.

Another embodiment of the invention is an optical media comprising a material having at least one optical property that changes in response to application of an electrical signal and affects the accessibility of the optical media. The change in the optical property is reversible and repeatable.

Another embodiment of the invention is a method for activating an optical media. An ID is obtained from a user to determine whether the user is authorized to activate the optical media. An activation signal is wirelessly transmitted to an activation device proximate the optical media to authorize activation of the optical media, and an electrical signal is sent from the activation device to the optical media to alter at least one optical property of and activate the optical media.

Another embodiment of the invention is an optical media that incorporates thin films or gels organized as a battery, the battery being rendered operable or inoperable by application of an external electrical signal to the thin films or gels.

Another embodiment of the invention is an article configured for activation. The article comprises an optical media and a material in contact with the optical media. The material has at least one optical property that is altered by application of an electrical signal to affect the readability or writeability of the optical media. A removable activation device is positioned proximate the material for applying the electrical signal to the material.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
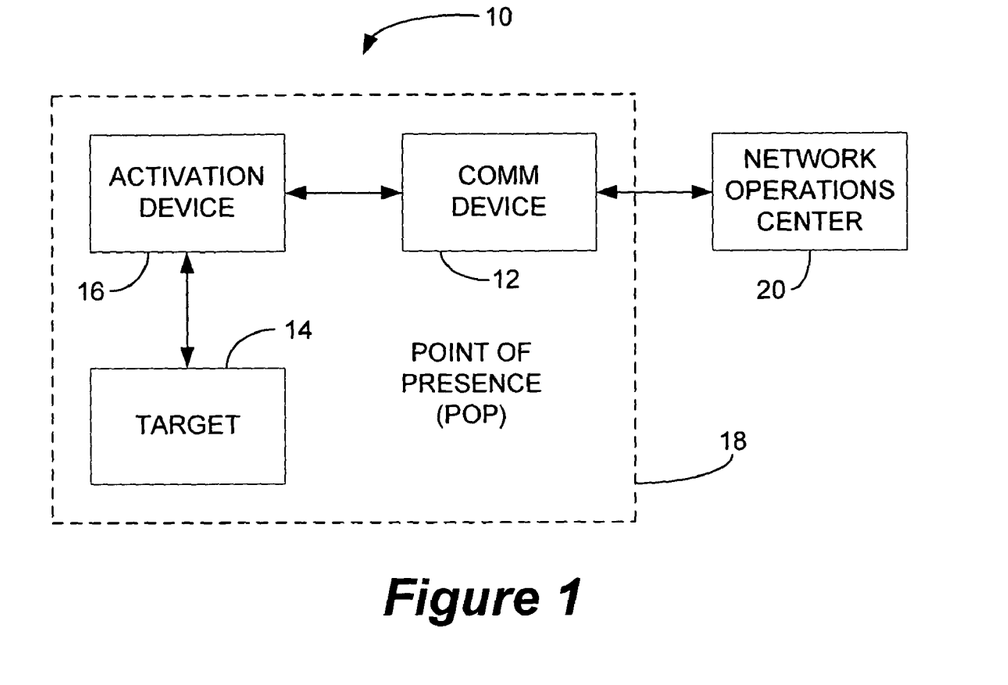
FIG. 1 is a block diagram of a wireless activation system according to the present invention.

A wireless activation system 10 according to the present invention is illustrated in FIG. 1. System 10 comprises a communication device 12, a target (item to be activated) 14 and an activation device 16 at a user's point-of-presence (POP) 18, and a network operations center (NOC) 20. Communication device 12 is used to wirelessly activate target 14 at the user's POP 18, with the assistance or participation of a remote NOC 20.

Communication device 12 should be construed broadly and includes any communication device capable of local acoustic output (typically via speakers) and wide area communication including, but not limited to, plain old telephones (POTs), portable or cellular phones, smart phones (such as J2ME, BREW and/or WAP enabled phones), personal digital assistants (PDAs), portable computers and so on. Typically, a user will interface with communication device 12 via voice command or via a user interface such as a keypad/keyboard or a touch screen.

Figure 2:
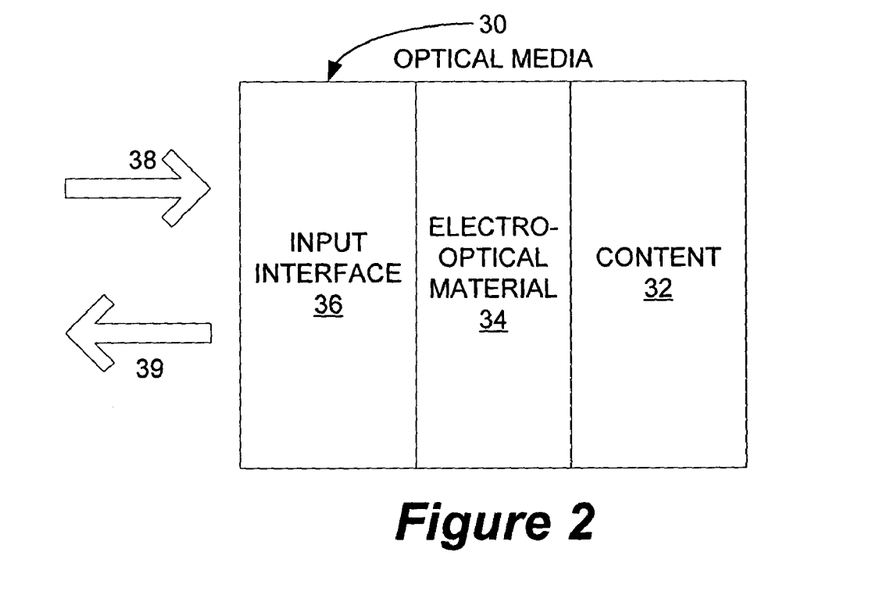
FIG. 2 is a block diagram of an optical media device according to the present invention.

Target 14 is some article, item or media at a user's point of presence that is to be activated. One type of item or target for which activation may commonly be desired is an optical media such as, for example, a compact disk (CD), video disk, digital versatile disk (DVD), laser disk or a hologram that stores content such as audio, video, images, codes, the layout or inner workings of the target, and other types of data and information. FIG. 2 generally depicts an optical media 30 according to the present invention comprising content 32, electro-optical material 34 and input interface 36. It must be understood that FIG. 2 is presented for ease of reference purposes only and does not limit the size, configuration or orientation of the components of optical media device 30 relative to each other.

The optical properties of optical media 30 are regulated by application of an electrical signal to optical media 30. In particular, optical media 30 contains an electro-optic material 34 whose properties can be changed in response to electrical signals to impact the transmissibility of light or to change the visual perception of optical media 30 (i.e., change its color, reveal or conceal information, etc.) or content 32 stored therein. Changes in material 34, in turn, affect the ability of a user or machine to read from, write to, address, perceive or otherwise gain optical access to optical media 30 and any content 32, data or other information stored therein. It may allow or prevent a CD or DVD to be read from or written to, for example, or conceal or make visible a hologram or other indicia on a credit card or driver's license. It may conceal, make visible or otherwise alter the appearance of any visual article or element used for identification, validation, security or other purposes on other types of items such as identification cards, security passes, tickets, coupons, products and so on. These are but a few examples of the many applications of the present invention which, in its most basic form, comprises an optical media that is altered by application of an electrical signal to affect the perceptibility of the optical media and/or content stored or embodied therein.

Material 34 is interspersed or layered in or on optical media 30. Material 34 may be layered on optical media 30, dispersed through optical media 30 or limited to specific locations, such as radial sectors, tracks, rings, patterns, layers and/or cylinders. It may be located on the surface of optical media 30, on top of the media's reflective layer or below the surface of optical media 30 (e.g. below a protective coating or varnish). One or more types and/or inclusions of electro-optic material may be provided.

Material 34 possesses one or more optical properties (transparency, reflectivity, color, pattern, etc.) that change in response to application of an electrical signal, and thereby affect in some manner optical access to optical media 30 and the content 32 stored therein. Examples of such optical properties include, without limitation, the ability of the material to block light, allow light to pass through or refract light, the path or reflection of the light, or the color and/or hue of the film. Examples of electro-optic materials suitable for use with the present invention include, without limitation, electrochromic films and gels and liquid crystal materials. The choice of the specific material should take into account the desired decay rate, if any. Some electro-optic materials change state very rapidly when power is applied or removed, while others change state more slowly and asymmetrically. A material might open (clear) quickly when power is applied, for example, but decay to a closed (opaque) state more slowly. Some materials change state when power is applied, and maintain that state when power is removed.

Input interface 36 receives an electrical signal 38 from an external source (typically an activation device) and conducts it to material 34. Input interface 36 may be coupled to both material 34 and content 32 and, as shown, is also capable of generating output signals 39 that may include, for example, information about the state or content of optical media 30. Electrical signal 38 may include power and/or data (information) components, and interface 36 may have separate connections for receiving these components. Material 34 is typically "activated" (meaning that some optical property of material 34 is altered) by application of power. To provide security and control, however, additional data or information may be needed to regulate delivery of power to material 34. Hence, electrical signal 38 may contain both power and data/information (or power and data signals may be separately received).

The power used to activate material 34 may be supplied by a source internal to optical media 30 (e.g. a thin film or layered materials battery), by an external power source (e.g. an activation device) or by a combination of the two. If power is supplied by an internal source, logic internal to optical media 30 may be activated in response to data contained in signal 38 and used to regulate delivery of power to material 34. The logic may be as simple as a gate or a filter. An activation device may send an appropriate code to optical media 30, for example, and logic within optical media 30 may use the code to switch an internal battery off or on. If power is supplied by an external source (activation device), signal 38 may contain both data (e.g. a code) and power. Logic in optical media 30 regulates delivery of the electrical signal power to material 34 according to the electrical signal code.

Input interface 36 and material 34 may be thought of together as an "optical shutter" whose properties are regulated by power and data signals applied thereto. The period of time the shutter is open and the speed with which the window opens or closes can be regulated by regulating the electro-optical material decay rate. The shutter may automatically close some period of time after it has been opened (or vice versa). Where separately addressable inclusions of electro-optic material are used, another property may be changed in conjunction with the shutter (i.e., the shutter may open and the color of the separate inclusion of material may change).

Optical media 30 may include logic, gates and/or filters (not shown) to regulate or control access to material 34 and/or content 32. These additional elements may be a part of input interface 36, or may be contained within a separate component. In one example, as noted above, logic may be used to regulate application of power to material 34. In another example, a band-pass filter may be implemented to cause material 34 to pass only signals (light) in a specific band to content 32, or to regulate power to material 34. Gates and/or filters may be used to protect optical media 30 and material 34 from unintended or damaging signals (a cessation in function/gating, for example, after repeated unauthorized attempts to activate optical media 32). Optical media 30 may also include logic to identify itself to external sources, and to monitor, regulate and control access to and usage of content 32. Usage may be limited to a certain number or period of times, for example, or access may be granted only to particular types of access devices. Access can be monitored in detail including what accessing device was used, when the access occurred, the frequency of the access and whether the access was authorized or unauthorized.

As will be described in more detail herein, optical media 30 may also include an embedded ID or identification sequence that is provided to an activation device on receipt of an appropriate initiation signal. The ID may be encoded and printed on, stored or embedded in material 34 or another portion of optical media 30.

Material 34 may also be used to construct a battery within optical media 30. In addition to being deployed to affect the optical properties of optical media 30, for example, electrochromic materials within optical media 30 may be organized in such a way that they produce electricity. The battery may be incorporated into optical media 30 in such a way that it provides or ceases to provide power to optical media 30 upon the occurrence of some particular event, such as activation of material 34, a change of state in material 34, or removal/addition of an attached activation device.

The change in the optical properties of material 34 may be reversible and repeatable. Hence, where the optical medium is a CD, for example, the film's optical properties may be repeatedly changed to make the CD readable or non-readable. This is an important distinction relative to processes that employ single use, non-reversible chemical processes to activate or deactivate a medium.

In addition to changing one or more optical properties of optical media 30 (or properties of a target 14 in general), the electrical signal applied by activation device 16 may also alter data or information stored on optical media 30. For example, with each use, activation device 16 may alter the unique code or ID associated with optical media 30 in order to improve security.

Referring again to FIG. 1, activation device 16 is configured to apply an electrical signal to target 14 and is also in communication with communication device 12. As described above, the electrical signal may include power and/or information components. The information components may take alternative forms and/or utilize alternative modes of communication between the activation device and the target such as RF, optical, infrared and reflective light. Activation device 16 may be embedded in target 14 and reusable, or separate and/or removable from target 14. If separate or removable from target 14, activation device 16 may be disposable. If target 14 is a DVD or credit card, for example, activation device 16 may take the form of a removable sticker or tag. Activation device 16 may involve a combination of both a disposable element (a sticker)

Figure 3A:
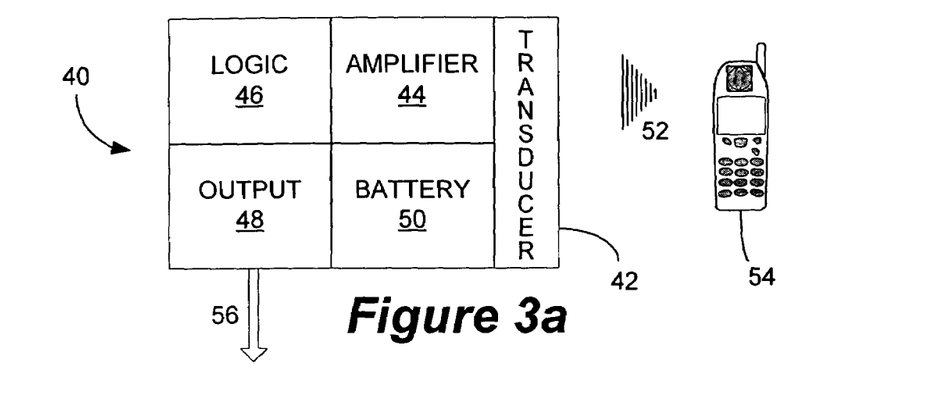
FIGS. 3A-C are block diagrams of activation devices according to the present invention.
Figure 3B:
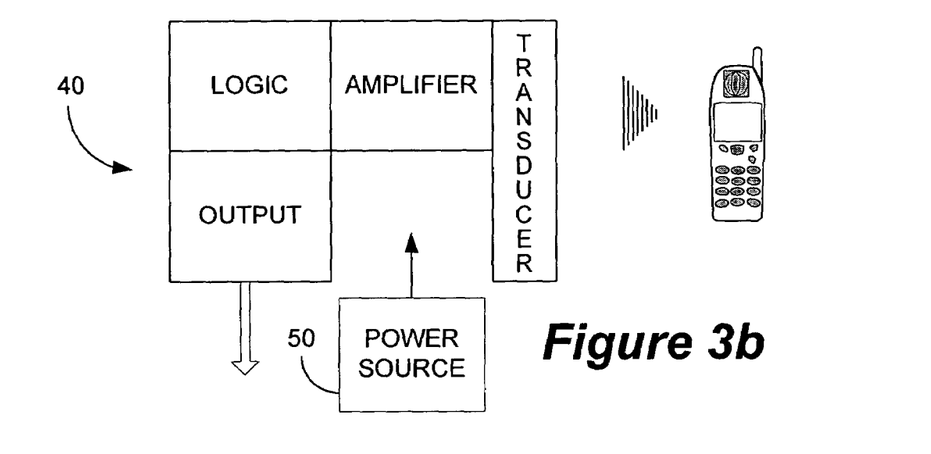
Figure 3C:
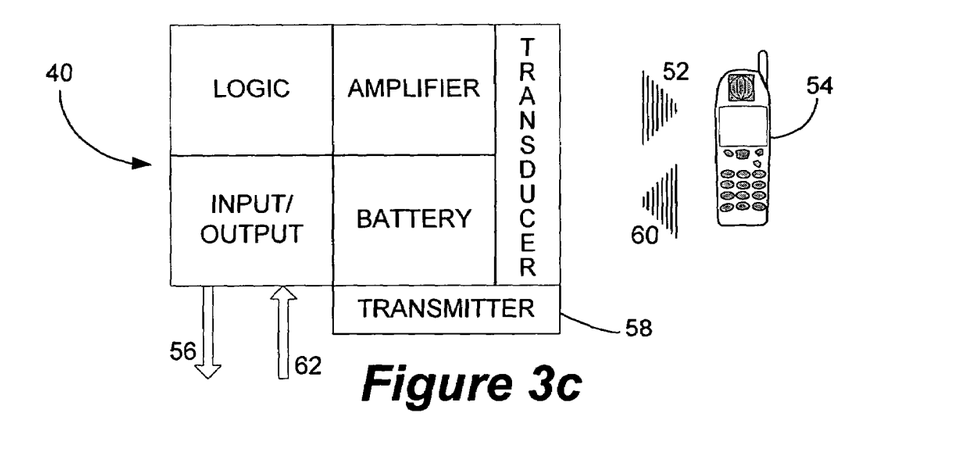

Exemplary implementations of an activation device 40 according to the present invention are illustrated in FIGS. 3A-C. In its most basic configuration, depicted in FIG. 3A, activation device 40 comprises a transducer 42, amplifier 44, logic 46, an output 48 to the target and a battery or power source 50.

Transducer 42 may comprise, but is not limited to, an acoustic receiver, thin film, piezoelectric microphone, piezoelectric biomorph actuator, electret microphone, silicon micromachined microphone or a strain gauge. Transducer 42 receives an acoustic activation signal or sequence 52 from communication device 54 and outputs an electrical signal to amplifier 44. Hence, where communication device 54 is a telephone, the user may simply place telephone 54 close enough to activation device 40 to allow a microphone in transducer 42 to receive an activation signal emitted from a speaker in device 54.

Amplifier 44 amplifies the output from transducer 42 and provides the amplified signal to logic 46. Logic 46 defines or characterizes an electrical signal destined for the target based on the activation signal or sequence received from transducer 42. Output 48 is an electrical interface to the target and may comprise, for example, a surface contact, bridge or micro wires. It outputs an electrical signal 56 to the target as defined by logic 63. Alternatively, the output signal may be in the form of light (LED), RF or other appropriate proximity communication techniques.

As depicted in FIG. 3A, power source 50 may be a battery contained within activation device 40. Alternatively, as depicted in FIG. 3B, power source 50 may be external to activation device 40. Power source 50 may, for example, be contained within the target or even be a part of the acoustic signal 52 received from communication device 54. Activation device 40 may also include a transmitter 58 for transmitting a signal 60 to communication device 54 (FIG. 3C). Signal 60 may be, for example, an acoustic signal containing or consisting of an ID transmitted to telephone 54 in response to an initiation sequence from telephone 54 or NOC 20 (see description below). As also depicted in FIG. 3C, activation device 40 may receive an input 62 from the target. The input may be a signal containing an ID (if stored at the target), information about the state of the target and/or any other type of useful information regarding the target.

In one implementation, where the activation device is configured as a disposable item such as a peel-off sticker, an electrical signal is continuously supplied via a battery in the activation device to the target. When the activation device is removed from the target, the electrical signal is interrupted, triggering a mechanism within the target which activates or deactivates the material. For example, the optical media could be shipped with an "open" optical shutter, but unreadable due to the presence of the sticker. The open state is maintained as long as power is present. When the sticker is removed, power is no longer present and the shutter will begin to close, leaving the content accessible for a predetermined period of time.

In another implementation, the activation device sends an appropriate signal or code to the target (i.e., via signal 56 in FIG. 3C). In response, logic within the target generates a signal that is transmitted to the activation device (signal 62). Logic in the activation device uses the signal from the target to regulate the supply of power to the target. The code/signals transmitted to and from the activation device will typically be dependent on or related to decision rules, algorithms or other information generated by or stored in NOC 20.

Activation device 40 may also comprise a memory and clock (not shown). The memory may store information such as the ID of the activation device, and other variables or information related to activation, such as any ID received from the target (as part of signal 62), numbers of allowed and attempted activations and activation attempts and logic variables received from the NOC and user. The clock may be used to limit usage to a period of time or to limit the opportunity to activate to a period of time.

Figure 4:
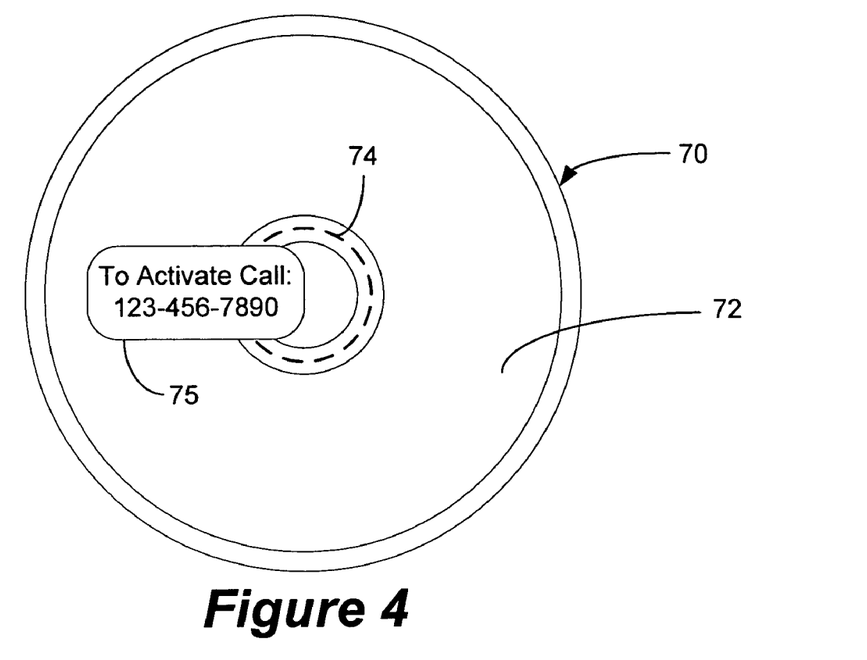
FIG. 4 is a diagram of one implementation of a target and activation device according to the present invention.

FIG. 4 depicts one example implementation of a target 70 and activation device 75 according to the present invention. Target 70 is an optical media in the form of a DVD. DVD 70 comprises an electrochromic film 72 layered just below the protective layer and above the reflective layer of DVD 70. DVD 70 also comprises an input interface 74 near its center in the form of a micro-wire ring that is just under the protective finish or varnish of DVD 70 and connected to film 72. An activation device 75 in the form of a removable sticker or tag is coupled to DVD 70 directly over ring 74 with conductive adhesive. Hence, the output of activation device 75 is directly over input interface 74.

Activation device 75 issues an electrical signal that causes the some property to change in electrochromic film 72. In one implementation, film 72 changes from opaque to clear so that a laser light from the DVD player is allowed to pass through the reflective layer beneath, and DVD 70 is thereby operable and readable by the player. Alternatively (or additionally), film 72 may change color to provide a visual indicator of the state of DVD 70 (e.g. readable or non-readable) or to reveal additional information. Where activation device 75 takes the form of a removable sticker or tag, once DVD 70 has been activated, sticker 75 may be peeled off DVD 70 and discarded.

Figure 5:
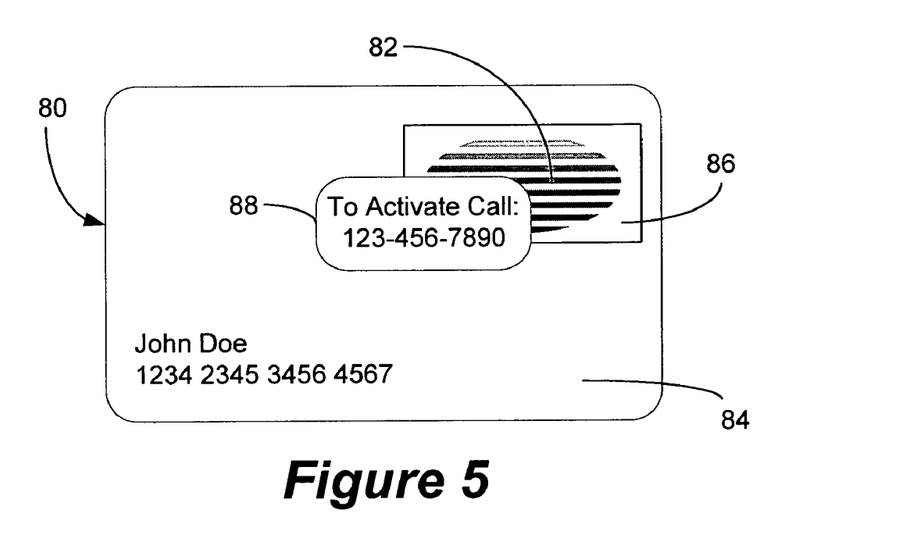
FIG. 5 is a diagram of another implementation of a target and activation device according to the present invention.

FIG. 5 depicts another example implementation of a target 80 and activation device 88 according to the present invention. Target 80 comprises an optical media, in the form of a hologram 82 embedded in a polymer media, in the form of a credit card 84. An electrochromic film 86 is layered on top of hologram 82. Alternatively, hologram 82 is incorporated into the bottom layer of film 86. Removable activation device 88, in the form of a sticker with instructions, is placed on the card proximate or in contact with film 86. An electrical signal from activation device 88 causes film 86 to change from opaque to clear thus revealing the underlying hologram (or different portions of the hologram depending on the activation code) and allowing use of credit card 84.

As an alternative to hologram 82, any visual article or element that is used for security, identification, validation, etc. may be used. Moreover, application is not limited to a credit card, or even to a polymer media. Other applications include, without limitation, driver's licenses, identification cards, security passes, tickets, coupons, products and so on.

Figure 6:
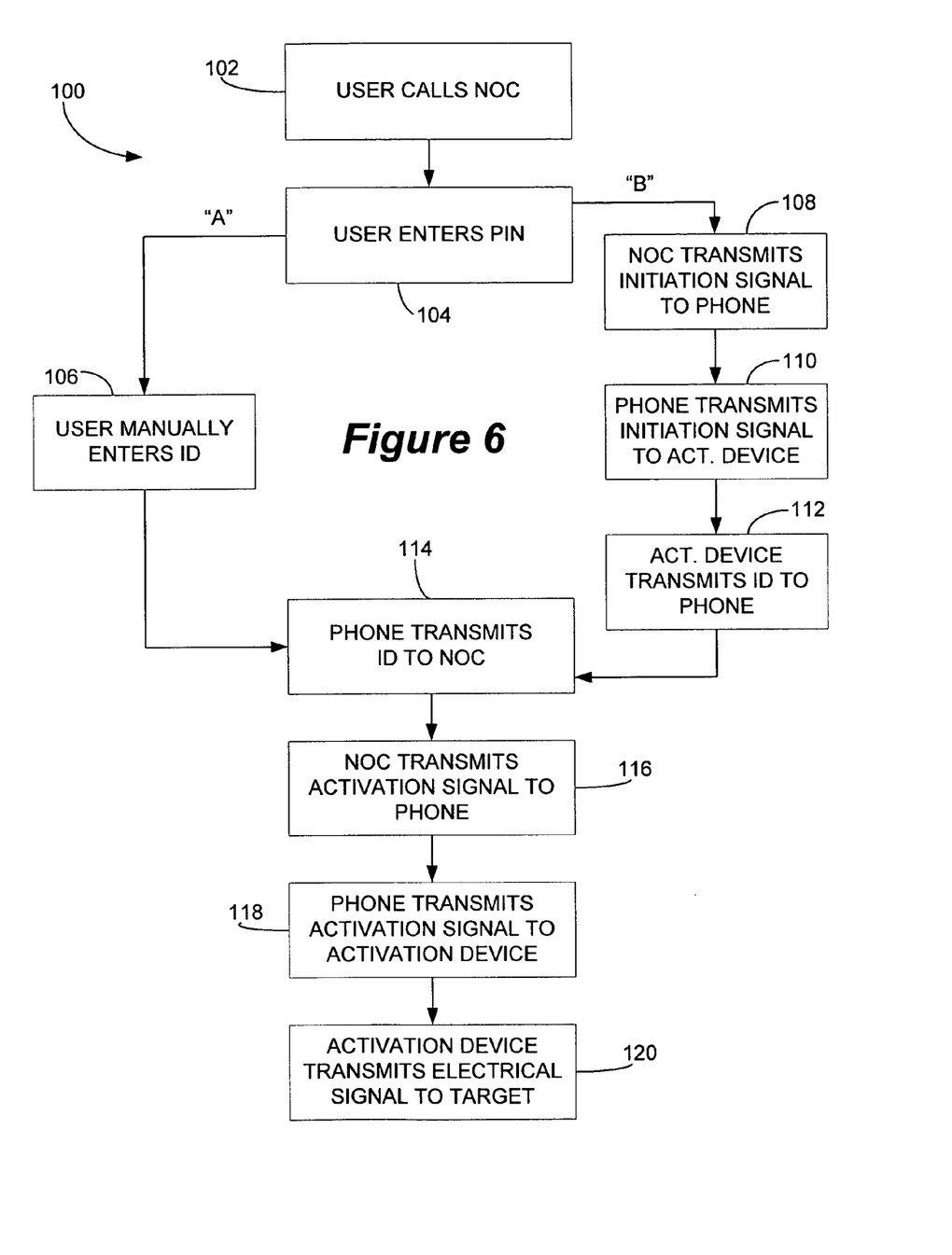
FIG. 6 is a flow diagram of a method for wireless activation according to the present invention.

FIG. 6 depicts a method 100 for wireless activation of a target according to the present invention. Method 100 is described in conjunction with system 10 of FIG. 1. In step 102, a user desiring to activate a target 14 calls network operation center (NOC) 20 with communication device 12. Where activation device 16 is a sticker, for example, the telephone number of NOC 20 may be printed on the sticker (see, e.g., FIGS. 4 and 5). It could also be printed directly on target 14. NOC 20 is typically a third party entity that participates in and/or regulates the activation process. The level and nature of participation by NOC 20 may vary. In one implementation, NOC 20 confirms that a user attempting to activate a device or target 14 is authorized to activate that device. NOC 20 may also perform other functions such as collecting payment and accounting. The ability to regulate activation by a remote party is key to many economic models, and is to be distinguished from systems that activate by simple exposure to air or light without remote regulation. Typically, NOC 20 will be remote from the user's POP 18. In some embodiments, however, the NOC or third party authorizing entity may be represented at POP 18 via proxy on or in conjunction with the communication device, or on a stored-value system such as a prepaid card, digital wallet, etc.

In an optional step 104, the user enters a PIN to demonstrate that he is an authorized user. Next, communication device 12 acquires an identification sequence or ID(s) to transmit to NOC 20. Target 14 and activation device 16 may each have unique IDs, and the NOC 20 may require one, both or none of them depending on the level of security desired. The ID may be formatted in any appropriate fashion, including alpha numeric, binary or a characteristic signal (e.g. designed for processing by band-pass filters or digital signal processors). This may be done via manual entry by the user (flow path "A") or by transmission from the activation device (flow path "B"). In flow path "A", an ID is entered manually by the user in step 106. A target ID, for example, may be printed on the target, or an activation ID may be printed on activation device 16.

In flow path "B", the ID is not entered manually by the user but, rather, is stored at the activation device, target or a separate source at the user's point-of-presence. The ID may be stored in memory at activation device 16, printed on target 14, acquired from target 14 or, alternatively, accessed from a separate source at the user's point-of-presence 18. In flow path "B", where the ID is not entered by the user but acquired from another source, process 100 could be initiated directly by NOC 20 without a user phone call.

In some cases, it may not be necessary to obtain an ID at all. In certain promotional applications, for example, the particular phone number called by the consumer will by default determine the ID of the target. Where NOC 20 initiates the call, it may already know the target ID.

After either user or NOC initiation, NOC 20 transmits an initiation signal to communication device 12 (step 108), and communication device 12 then transmits an initiation signal to activation device 16 (step 110). The initiation signals may be alpha numeric, binary, characteristic signals or any other appropriate format. This may be done, by example, via an acoustic signal generated by NOC 20, or by a J2ME application resident on communication device 12 that transmits an acoustic initiation signal to activation device 16 upon receipt of instructions from NOC 20. Upon receiving the initiation signal, activation device 16 "wakes up" and transmits an ID to communication device 12 (step 112). Preferably, the transmission of an ID from activation device 16 to communication device 12 is acoustic. Alternatively, or additionally, upon receipt of the initiation signal, activation device 16 may need to acquire an ID from the target itself. This may be accomplished by supplying power or an electrical signal from activation device 16 to target 14. Logic in target 14 "wakes up" and outputs the ID to activation device 16, which retransmits the ID to communication device 12.

After either manual or automatic acquisition of an ID from target 14 and/or activation device 16, communication device 12 transmits the ID to NOC 20. Preferably, the ID is relayed to NOC 20 as an acoustic voice or audio signal. This transmission may occur either automatically or with user intervention (i.e., the user presses an "authorize" key/button or the like on the telephone keypad). Upon receiving the ID, NOC 20 accesses information and records related to the user to determine whether that user is authorized to activate target 14. The information and records accessed by NOC 20 may include some or all of (a) information related to the user based on the user's ID and phone number associated with communication device 12 he is calling from and/or the phone number associated with his account; (b) the phone number called by the user; (c) activation device 16; (d) target 14; and (e) point-of-presence 18. NOC 20 may also access decision rules. Based on the accessed information/records and decision rules, NOC 20 generates and transmits an activation signal to communication device 12 (step 116). The activation signal may be alpha numeric, binary, a characteristic signal or any other appropriate signal format.

After receiving the activation signal, communication device 12 retransmits an activation signal to activation device 16 (step 118). As previously described, activation device 16 is positioned to provide an electrical or other signal to target 14. The activation signal may be transmitted automatically or with some form of user intervention. The user, for example, may indicate his final acceptance or confirmation/authorization of charge. After receiving the activation signal, activation device 16 outputs an electrical signal to target 14 (step 120). The electrical signal transmitted by activation device 16 alters some property of the optical media. It may, for example, change the state of a material contained in the optical media (e.g. clear to opaque) to change the readability or writeability of the optical media.

Finally, the various signals that are exchanged in method 100 may be encoded/encrypted and various steps in the encoding/encrypting; decoding/decrypting process may occur at NOC 20, activation device 16 and target 14 (separately or in combination). An authorization sequence, for example, may depend upon a combination of codes and/or IDs located at activation device 16 and target 14.

While various embodiments of the invention have been described, it will be apparent to those of ordinary skill in the art that many more embodiments and implementations are possible that are within the scope of this invention.

What is claimed is:

1. A method for controlling access to content within an optical media, comprising the steps of:
   providing an activation device in or on the optical media;
   receiving an activation signal at the activation device;
   applying, using the activation device, an electrical signal to the optical media to alter at least one optical, physical or electrical property of the optical media.

2. A method as claimed in claim 1, wherein the activation device receives the activation signal from a communication device and causes the electrical signal to be applied to an electro-optic material contained in or on the optical media.

3. The method of claim 1 further comprising:
   obtaining an optical media ID from the optical media; and
   generating the activation signal based on the optical media ID.

4. The method of claim 1 wherein the activation signal is wirelessly transmitted to the activation device.

5. The method of claim 2 wherein applying the electrical signal to the electro-optic material causes content in or on the optical media to become perceptible.

6. A wireless activation system for activating a target, comprising:
   an activation device configured to cause an electrical signal to be applied to a target in response to an activation signal to effect a change in an optical, physical or electrical property of the target to thereby activate the target;
   a communication device for wirelessly providing an activation signal to the activation device;
   a third party entity that participates in the activation of the target in response to information provided by the communication device; and
   wherein the activation device is part of a sticker disposed proximate the optical media and in communication with the communication device.

7. A method for activating a target at a user's point of presence having a communication device and an activation device, the method comprising the steps of:
   determining whether the user is authorized to activate the target;
   generating an activation signal based on this determination;
   transmitting the activation signal from a third party to the communication device;
   wirelessly transmitting the activation signal to the target via the activation device to alter at least one physical, optical or electrical property of the target; and
   wherein elements of the activation device are composed as part of a sticker disposed positioned proximate the target and communicatively coupled to the communication device.

8. The method of claim 7 further comprising:
   removing the sticker from the target alters at least one physical, optical or electrical property of the target.

9. The method of claim 3 further comprising:
   transmitting the optical media ID to a network operations center which generates the activation signal in response to the optical media ID.

10. The method of claim 9 further comprising:
    encrypting the optical media ID prior to transmission to the network operations center.

11. The method of claim 9 further comprising:
    transmitting the activation signal from the network operations center to the activation device.

12. The method of claim 11 further comprising:
    encrypting the activation signal prior to transmission to the activation device.

* * * * *